(12) United States Patent
Hansen et al.

(10) Patent No.: US 12,377,895 B2
(45) Date of Patent: Aug. 5, 2025

(54) MOBILE ROBOT TRANSMISSION ARRANGEMENT AND METHOD

(71) Applicant: ROEQ APS, Vissenbjerg (DK)

(72) Inventors: Michael Hansen, Morud (DK); Carsten Sørensen, Herlev (DK); Benni S. Lund, Aarup (DK)

(73) Assignee: ROEQ ApS, Vissenbjerg (DK)

( * ) Notice: Subject to any disclaimer, the term of this patent is extended or adjusted under 35 U.S.C. 154(b) by 372 days.

(21) Appl. No.: 17/796,637

(22) PCT Filed: Jan. 22, 2021

(86) PCT No.: PCT/EP2021/051421
§ 371 (c)(1),
(2) Date: Jul. 29, 2022

(87) PCT Pub. No.: WO2021/151786
PCT Pub. Date: Aug. 5, 2021

(65) Prior Publication Data
US 2023/0052440 A1 Feb. 16, 2023

(30) Foreign Application Priority Data
Jan. 31, 2020 (DK) .......................... PA 2020 00118

(51) Int. Cl.
*B62B 3/02* (2006.01)
*B62B 3/00* (2006.01)
*B62B 3/10* (2006.01)

(52) U.S. Cl.
CPC ................ *B62B 3/02* (2013.01); *B62B 3/002* (2013.01); *B62B 3/10* (2013.01); *B62B 2206/06* (2013.01)

(58) Field of Classification Search
CPC .. B62B 3/02; B62B 3/002; B62B 3/10; B62B 2206/06
See application file for complete search history.

(56) References Cited

U.S. PATENT DOCUMENTS

2018/0086561 A1 3/2018 Stubbs et al.
2019/0337785 A1* 11/2019 Chapman ............... F16M 11/18
(Continued)

FOREIGN PATENT DOCUMENTS

CN 206465110 9/2017
DE 32 13 983 10/1983
(Continued)

OTHER PUBLICATIONS

International Search Report for PCT/EP2021/051421 dated Apr. 19, 2021, 3 pages.
(Continued)

*Primary Examiner* — Saul Rodriguez
*Assistant Examiner* — Ashley K Romano
(74) *Attorney, Agent, or Firm* — Nixon & Vanderhye P.C.

(57) ABSTRACT

A mobile robot transmission arrangement is provided herein. The mobile robot transmission arrangement comprises a movable actuator assembly and a transmission. The transmission element is movably connected to the actuator assembly such that the transmission element is guided in a vertical plane (z) by moving the actuator assembly in a horizontal plane (xy). The actuator assembly comprises one or more vertically tilted tracks, wherein the transmission element is connected to the actuator assembly by means of said one or more tracks.

13 Claims, 9 Drawing Sheets

(56) References Cited

U.S. PATENT DOCUMENTS

| | | | | |
|---|---|---|---|---|
| 2019/0351927 A1* | 11/2019 | Yahner | .................... | B66F 9/082 |
| 2020/0284167 A1* | 9/2020 | Malaise | ............. | B23K 37/0538 |
| 2021/0213992 A1* | 7/2021 | Curlee | .................. | B62B 5/0006 |
| 2024/0253679 A1* | 8/2024 | Xia | ........................... | B62B 3/02 |

FOREIGN PATENT DOCUMENTS

| | | |
|---|---|---|
| DE | 10 2013 000 259 | 7/2014 |
| WO | 2018/058035 | 3/2018 |
| WO | 2018/130315 | 7/2018 |
| WO | 2019/063816 | 4/2019 |

OTHER PUBLICATIONS

Written Opinion of the ISA for PCT/EP2021/051421 dated Apr. 19, 2021, 6 pages.

\* cited by examiner

MOBILE ROBOT TRANSMISSION ARRANGEMENT AND METHOD

This application is the U.S. national phase of International Application No. PCT/EP2021/051421 filed Jan. 22, 2021 which designated the U.S. and claims priority to DK PA 2020 00118 filed Jan. 31, 2020, the entire contents of each of which are hereby incorporated by reference.

TECHNOLOGY FIELD

The present invention relates to mobile robots. The present invention also relates to a mobile robot transmission arrangement and a method.

BACKGROUND

Mobile robots are automated guided vehicles being programmed to operate in both indoor and outdoor logistics environments. These robots are widely used to transport various objects, goods or articles in private and public locations.

The articles to be transported are normally arranged on a rigid support structure, such as a table, a cart, or similar. The purpose of the mobile robot is consequently to connect to the support structure in some manner, and to move the entire support structure including the articles arranged thereon. For this, the mobile robot is capable of adjusting its height.

In a retracted mode the mobile robot is able to position itself underneath the support structure to be transported. When in this position, the mobile robot is configured to increase its height to an elevated mode, where it connects to the support structure. Once connected, the mobile robot can carry the support structure with its loaded articles to its delivery position. Here, the mobile robot reduces its height back to the retracted mode, whereby the support structure is disconnected from the mobile robot. Transport of the support structure and the associated articles is thereby accomplished, and the mobile robot is available to perform another automated transport of articles.

Existing solutions for height-adjusting mobile robots cannot guarantee safety in regards to having a low center of gravity point during article transport. This is of paramount importance for assuring a stable and safe operation, particularly in certain events such as fast transport causing sudden deceleration or acceleration of the mobile robots, or when transporting fragile goods. There is currently no existing practical solution to the above described technical problems alone or even less so in combination, particularly while simultaneously being universally compatible to mobile robots in logistics environments. Even if some existing mobile robots have means for adjusting their heights, this is typically a tailored solution for each mobile robot.

In light of the observations above, the present inventors have identified these problems and shortcomings. Accordingly, an object of the present invention is to overcome, or at least mitigate one or more of these problems.

SUMMARY

An object of the present disclosure is to provide a transmission arrangement, a mobile robot, a logistics entity, a system, and a method which seek to mitigate, alleviate, or eliminate one or more of the above-identified deficiencies in the art and disadvantages singly or in any combination.

In a first aspect, a mobile robot transmission arrangement is provided. The mobile robot transmission arrangement comprises a movable actuator assembly and a transmission element. The transmission element is movably connected to the actuator assembly such that the transmission element is guided in a vertical plane by moving the actuator assembly in a horizontal plane. The actuator assembly comprises one or more vertically tilted tracks, and the transmission element is connected to the actuator assembly by means of said one or more tracks.

Technical provisions provided by the mobile robot transmission arrangement are multiple. The mobile robot effectively uses the transmission arrangement to adjust its height, thereby enabling many desired features in logistics environments. Loading, unloading and article transport can be simplified, since a number of different loading structures and areas can be reached by a mobile robot assisted by the transmission arrangement, no matter the height of the structure. Therefore, any type of mobile robot having a transmission arrangement can be used for this, which makes it universally compatible in any logistics environment that uses mobile robots. Another technical provision is that a vertically lower center of gravity is achieved during article transport, which contributes to a lesser amount of articles being lost due to sudden acceleration or deceleration. This in turn leads to a higher uptime related to speed and security, with low failure rates related to machine failures and compatibility issues. Additional technical provisions include that the transmission arrangement can be used to elevate, hoist or lower external support structures without requiring a specific type of vehicle for this. As the transmission arrangement is very robust, it is extremely helpful when heavy objects need to be lifted from e.g. carts or tables, by simply using the mobile robot as a type of hoisting device.

According to one embodiment, the transmission element is provided with at least one guide member that is fitted in a respective track of the actuator assembly in a sliding or rolling engagement.

According to one embodiment, the transmission arrangement further comprises a fixed frame that is supporting the actuator assembly and the transmission element. The fixed frame may comprise one or more linear tracks, and the actuator assembly may further comprise at least one guide member that is movably supported by said one or more linear tracks. The fixed frame may further comprise one or more steering members that are configured to prevent horizontal movement of the transmission element.

According to one embodiment, the actuator assembly comprises a drive unit for driving the actuator assembly. The drive unit may comprise an electrical linear actuator.

According to one embodiment, the transmission element further comprises one or more vertically extending pins that are configured to engage with a corresponding recess of an associated support structure when the transmission element is in a vertically elevated position. The steering member may comprise an opening that is configured to receive an associated pin, such that only vertical movement of the pin relative the opening is allowed.

According to one embodiment, the transmission element is at one end pivotally connected to at least one lever, which in turn is pivotally connected to the fixed frame at its opposite end. The transmission element may be connected to a planar surface that is adapted to be vertically elevated by the transmission element.

In a second aspect, a mobile robot is provided. The mobile robot comprises a top module that has a transmission arrangement according to the first aspect, and any embodiment thereof.

In a third aspect, a support structure, such as a table or a cart, is provided. The support structure is adapted to receive one or more pins of a transmission element in a transmission arrangement according to the first aspect, and any embodiments thereof.

In a fourth aspect, a system is provided. The system comprises a mobile robot according to the second aspect, and a support structure according to the third aspect.

In a fifth aspect, a mobile robot transmission method is provided. The method comprises a step of providing a movable actuator assembly comprising one or more vertically tilted tracks. The method also comprises a step of movably connecting a transmission element to the actuator assembly by means of said one or more tracks, such that the transmission element is guided in a vertical plane by moving the actuator assembly in a horizontal plane.

According to a further aspect, a transmission mechanism for mobile robots is provided. The mechanism (transmission system) is distinguished by being able to create a transformation of motion from the plane x, y to a motion out of the plane, z-direction, so that the motion out of the plane is made relatively large in relation to the constructional height of the mechanism. The movement in the z-direction can be used in different top modules. One or more locking pawls can be slid up from a top module and lock a carriage in the plane x, y relative to the top module. One or more locking pawls can be connected via a plate, thereby creating a top module that acts as a lifting unit that can run under a pallet or other goods, lift it free from a stand at one position and move, and then deliver it to another position. By using an activating unit that moves in the plane x, y, one can take advantage of the fact that most available electric actuators are typically flat and long, and thereby achieve a low construction height for the top module. This is important, as when moving goods with mobile robots, you want as low a center of gravity as possible. This is to ensure stable driving in the event of sudden braking and the like. A transmission system which transmits movement in a plane x, y to a movement out of the plane (z-direction) is provided, characterized in that an activating unit is moved in the plane x, y, whereby a shift in the z-direction is created for a transmission element that is locked to be moved only in the z-direction. A transmission system is provided, characterized in that an activating unit is provided with a backdrop track in which an element sitting on or integrated in a transmission element can roll or slide. A transmission system is provided, characterized in that an activating unit is equipped with an element that can slide or roll in a scenic track that sits on or is integrated in a transmission element. An activating unit is provided, characterized in that the activating unit is equipped with a bearing that rolls in a groove that ensures that the activating unit is guided in the plane x, y. An activating unit is provided, characterized in that the activating unit is equipped with a low friction element which slides in a groove which ensures that the activating unit is guided in the plane x, y. An actuating unit is provided, characterized in that the actuating unit is displaced in the plane relative to a frame unit by means of an actuator. A transmission element is provided, characterized in that one or more actuator elements sit on or are integrated in the transmission element and that this/these actuator element is locked by one or more guides when the transmission element is displaced in the z-direction. A transmission system is provided, characterized in that one or more actuator elements are used as locking pawls which limit external components/systems in moving in the plane x, y relative to the transmission element. A transmission system is provided, characterized in that one or more actuator elements are used as lifting columns which can lift packages/goods in the z-direction relative to the frame unit. A transmission system is provided, characterized by the fact that the ball ice track can be used as gearing, which can be done by adjusting the angle of the track in relation to the plane x, y, where a smaller angle enables heavier lifting. A transmission mechanism for installation in top modules for mobile robots is provided. The mechanism can be used for both creating engagement with trolleys, and as a mechanism in a top module that can lift goods free from a stand at one position and deliver it at another position.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale; emphasis instead being placed upon illustrating the example embodiments.

DETAILED DESCRIPTION OF THE EMBODIMENTS

Figure 1A:
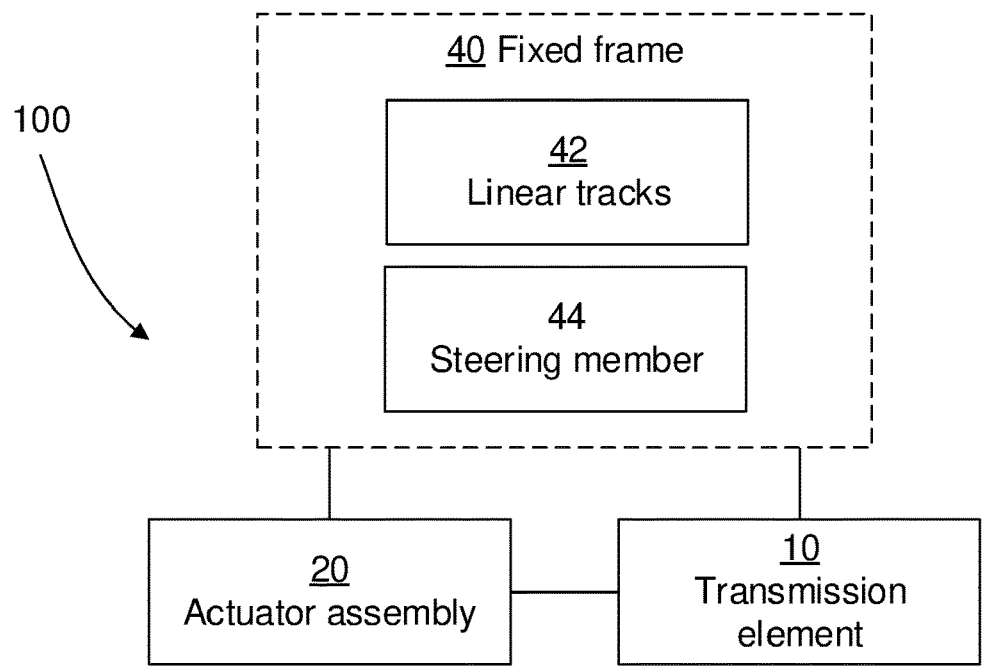
FIG. 1A is a schematic block diagram of a transmission arrangement according to an embodiment.

The following description is directed to a mobile robot transmission arrangement and components thereof which are used to adjust the height of loading areas in mobile robots, so that objects in logistics environments can be safely loaded, unloaded and transported between different locations.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the detailed description of the particular embodiments illustrated in the accompanying drawings is not intended to be limiting of the invention. In the drawings, like numbers refer to like elements.

Figure 1B:
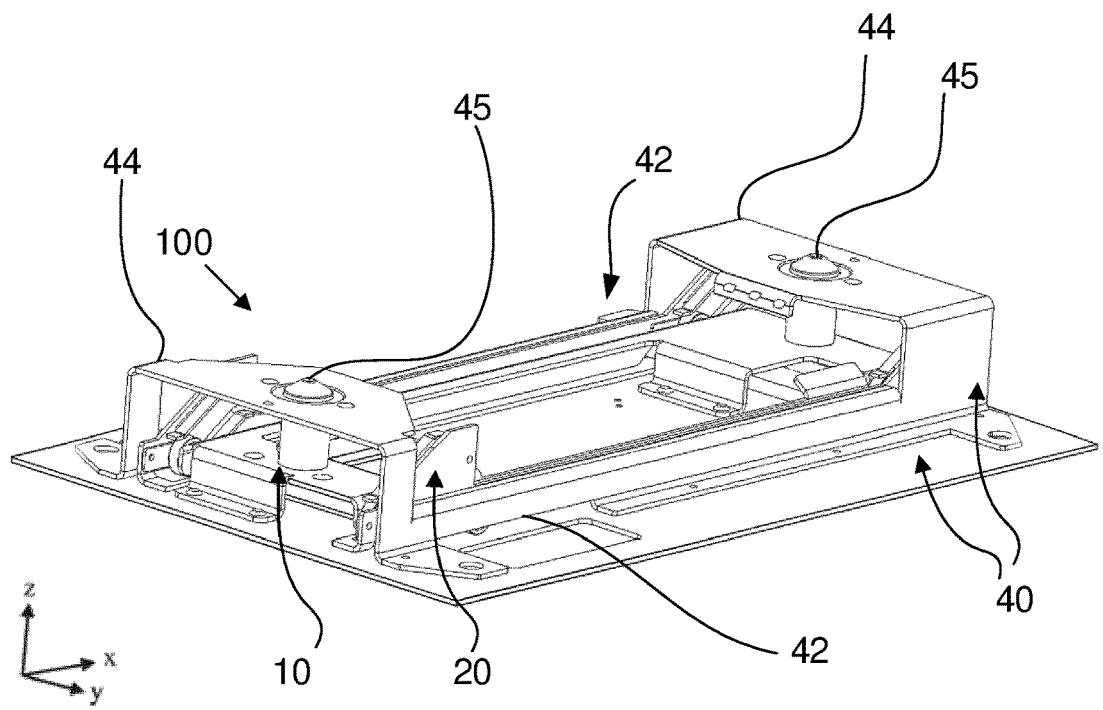
FIG. 1B is an isometric view of a transmission arrangement according to an embodiment.

With reference to FIGS. 1A-B, one embodiment is shown of a transmission arrangement 100. The transmission arrangement 100 is typically used in mobile robots operating in logistics environments, both indoors and outdoors, where loading, unloading and transporting of objects occur. Such facilities are typically related to industrial production, warehousing and stocktaking, but may also include a wide variety of facilities across multiple industries. The transmission arrangement 100 is however not restricted to mobile robots in particular, and can advantageously be used in other vehicles where safe and convenient height-adjustable characteristics are in demand. Alternatively, the transmission arrangement 100 can also be used with other devices or arrangements not necessarily being vehicles.

A transmission arrangement 100 such as the one illustrated in FIGS. 1A-B may vary in both size and extent. Although some important components are presented in FIGS. 1A-B, the transmission arrangement 100 may comprise other features not presently shown in the figures. The dimensions of the transmission arrangement 100 are designed to function with various vehicle, mobile robots or devices where it is arranged in.

In FIG. 1A, a block diagram is shown of one embodiment of a mobile robot transmission arrangement 100. The transmission arrangement 100 comprises an actuator assembly 20 that is configured to be movable in a horizontal plane xy in relation to a ground level. In one embodiment, the transmission arrangement 100 comprises a fixed frame 40 that is supporting the actuator assembly 20. The fixed frame 40 may be arranged within or mounted to a mobile robot or any other vehicle. In different embodiments of the invention, the actuator assembly 20 may also be supported by any other structure appropriately used to connect parts of a transmission arrangement suitable for mobile robots. The transmission arrangement 100 further comprises a transmission element 10 that is movably connected to the actuator assembly 20 and supported by the fixed frame 40. Similarly to the actuator assembly 20, the transmission element 10 may also be supported by other structures in the transmission arrangement 100. As the actuator assembly 20 is moved in a horizontal plane xy, the transmission element 10 is guided in a vertical plane z in relation to a ground level.

The fixed frame 40 may further comprise one or more tracks 42 extending along the surface of the fixed frame 40. The tracks 42 may be linear, although curved tracks 42 may also be possible. In one embodiment the tracks 42 are provided as grooves at the surface of the fixed frame 40. Alternatively, the linear tracks 42 are formed within a rail that is separately attached to the fixed frame 40 by using e.g. an adhesive material or other, more rigid, fastening means. Moreover, the fixed frame 40 may also comprise one or more steering members 44 being configured to prevent horizontal movement of the transmission element 10. Each steering member 44 preferably comprises at least one opening 45 that is configured to fit parts of the transmission element 10 therein.

FIG. 1B shows constructional details of a mobile robot transmission arrangement 100 according to one embodiment. The embodiment illustrates where the parts explained with references to the block diagram in FIG. 1A may be arranged within the transmission arrangement 100. As is seen from the figure, in this embodiment the fixed frame 40 serves as a base for the transmission arrangement 100. The fixed frame 40 preferably supports both the actuator assembly 20 and the transmission element 10, and these parts may be movably mounted thereto using any fastening means such as for example screws, bolts, an adhesive material, etc. Consequently, the transmission element 10 is arranged so that movement can be achieved in the vertical plane z and restricted in the horizontal plane xy in relation to the fixed frame 40. Moreover, the actuator assembly 20 is arranged so that movement can be achieved in the horizontal plane xy and restricted in the vertical plane z in relation to the fixed frame 40. As can be seen in FIG. 1B, this embodiment comprises two parallel linear tracks 42 extending along the horizontal plane xy of the fixed frame 40. Two U-shaped steering members 44, each comprising one opening 45, are adapted to receive parts of the transmission element 10.

Figure 2A:
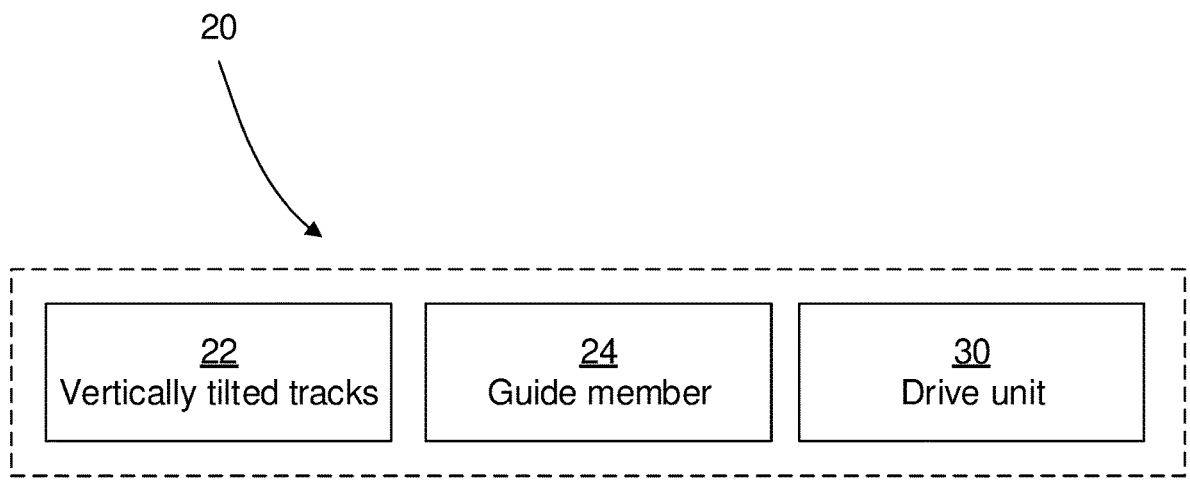
FIG. 2A is a schematic block diagram of an actuator assembly according to an embodiment.

FIG. 2A illustrates a block diagram of an actuator assembly 20 according to one embodiment of the invention. The actuator assembly 20 may comprise one or more vertically tilted tracks 22 whereto the transmission element 10 may be connected. Vertically tilted in this regard means that the tracks 22 extend between two vertical positions $z1$, $z2$, while also extending between two different horizontal positions. The vertically tilted tracks 22 are preferably configured to receive the transmission element 10, and in response to having moved the actuator assembly 20 thereby guiding the transmission element 10 in the vertical plane z between the two vertical positions $z1$, $z2$. Alternatively or additionally, the vertically tilted tracks 22 are used as a gearing by adjusting the angle $\theta$ of the tracks 22 in relation to the horizontal plane xy.

The actuator assembly 20 may further comprise at least one guide member 24 that is movably supported by the one or more tracks 42 of the fixed frame 40. The at least one guide member 24 preferably comprises a low-friction material so that a gliding movement being as friction-free as possible is achieved for the movement of the actuator assembly 20 within the one or more tracks 42. Alternatively, the at least one guide member 24 may comprise wheels, rollers or casters, etc., for achieving a rolling engagement of the at least one guide member 24 within the one or more tracks 42.

Additionally, the actuator assembly 20 may comprise a drive unit 30 that is responsible for driving the actuator assembly 20 in the horizontal plane xy along the one or more tracks 42. The drive unit 30 may be embodied as an electrical linear actuator, or any other drive unit 30 suitable in mobile robot transmission arrangements. The drive unit 30 may initiate movement of the actuator assembly 20 in between two horizontal positions $xy1$, $xy2$, as well as stop the movement if required. The horizontal positions $xy1$, $xy2$ are linked to the vertical positions $z1$, $z2$ such that the distance between $xy1$ and $xy2$ is matched to the horizontal extension of the tilted tracks 22. Stopping the movement of the actuator assembly 20 may for instance be required if a malfunction has been discovered, or if the transmission element 10 has reached its vertical end positions $z1$, $z2$. In an alternative embodiment, the drive unit 30 may stop the actuator assembly 20 at a desired height not located at the vertical end positions z1, z2. In this embodiment, the desired height may be controlled by a control unit (not shown). The control unit may in one embodiment trigger an alarm if any malfunction is detected.

Figure 2B:
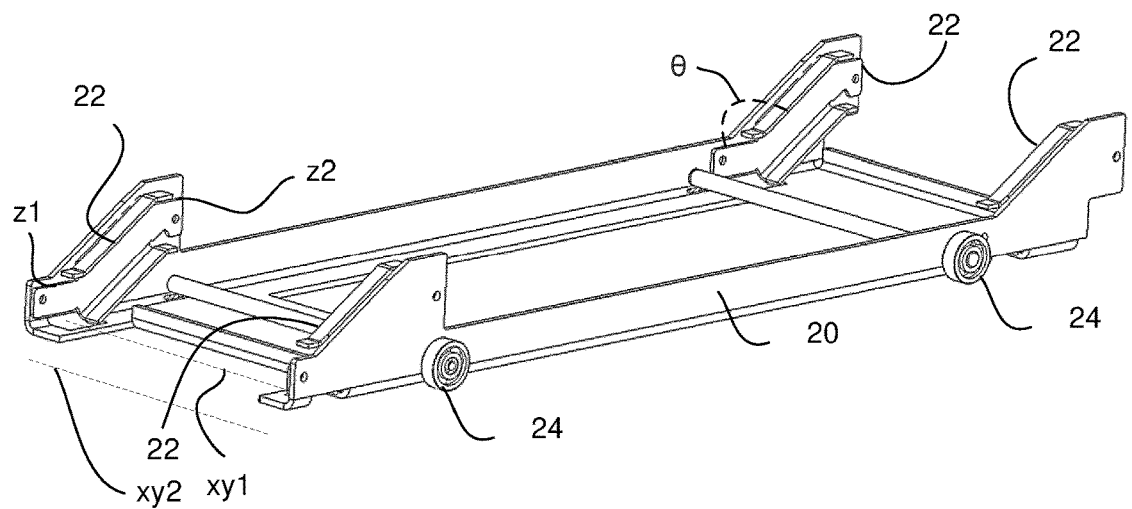
FIG. 2B is an isometric view of an actuator assembly according to an embodiment.

FIG. 2B shows an actuator assembly 20 according to one embodiment. The embodiment illustrates where the parts explained with references to the block diagram in FIG. 2A may be arranged within the actuator assembly 20. As is seen from the figure, in this embodiment the actuator assembly 20 comprises four vertically tilted tracks 22. The tracks 22 are in this embodiment arranged generally at a respective corner of the actuator assembly 20, and extending between the two vertical positions z1, z2. The actuator assembly 20 comprises four guide members 24, being depicted as wheels or rollers in this embodiment. Two guide members 24 are located at each long side of the actuator assembly 20, and are preferably arranged within the two tracks 42 of the fixed frame 40 as shown in FIG. 1B. The drive unit 30 (not shown) may be arranged anywhere near the actuator assembly 20 such that movement can be controlled.

In the embodiment shown in FIG. 2B, it is seen that the actuator assembly 20 is provided in one piece. "Provided in one piece" is in this sense referring to that the actuator assembly 20 has robust mechanical connections between components provided therein. Consequently, the parts associated with the actuator assembly 20 are moving as one unit, in the same direction, upon the actuator assembly 20 being moved in a certain direction along the horizontal plane xy.

Figure 3A:
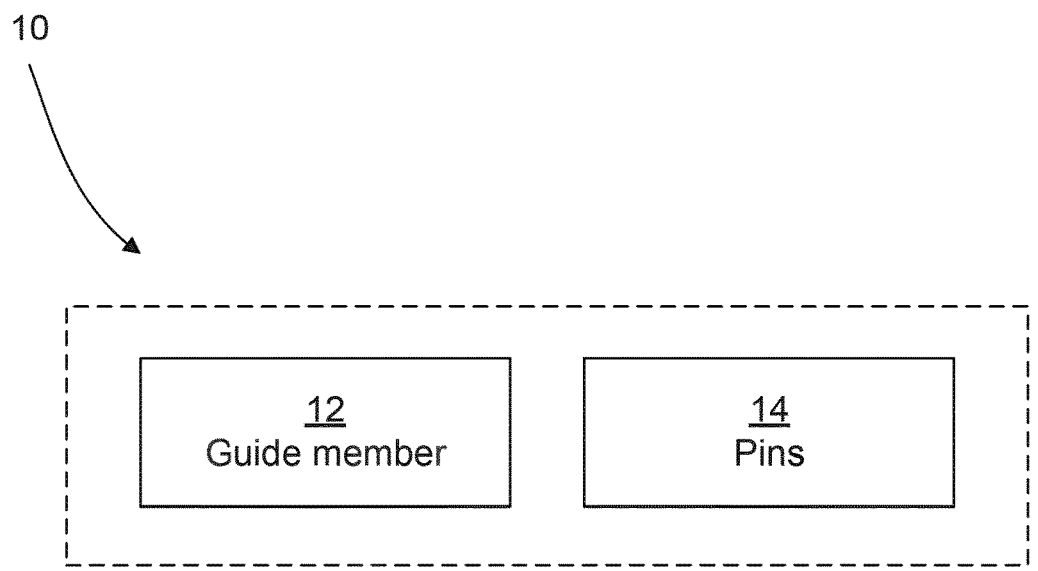
FIG. 3A is a schematic block diagram of a transmission element according to an embodiment.

FIG. 3A illustrates a block diagram of a transmission element 10 according to one embodiment of the invention. The transmission element 10 may comprise one or more guide members 12 that are fitted in a respective vertically tilted track 22 of the actuator assembly 20 in a rolling or sliding engagement. Similarly to the guide members 24 of the actuator assembly 20, the guide members 12 of the transmission element 10 may comprise wheels, casters or rollers. Alternatively, a low-friction material is used so that the guide members 12 can be smoothly guided along the tracks 22.

The transmission element 10 further comprises one or more vertically extending pins 14. Each opening 45 of the steering members 44 of the frame 40 as shown in FIG. 1B are configured to receive an associated pin 14 such that only vertical movement of the pin 14 relative the opening 45 is allowed. Upon being fitted inside the openings 45, the openings 45 are thereby effectively preventing horizontal movement of the transmission element 10. As the actuator assembly 20 is moved in the horizontal plane xy, an achieved effect of this is therefore a corresponding movement of the transmission element 10 that is caused in the vertical plane z. As a result, the pins 14 are vertically extending in a vertically elevated position of the transmission element 10. In this embodiment, the vertically extending pins 14 are configured to engage with a corresponding recess of an associated support structure 50. The transmission arrangement 100 is thus configured to vertically elevate, hoist, or lower any support structure 50, such as a table or a cart, that in turn is adapted to receive the one or more vertically extending pins 14.

Figure 3B:
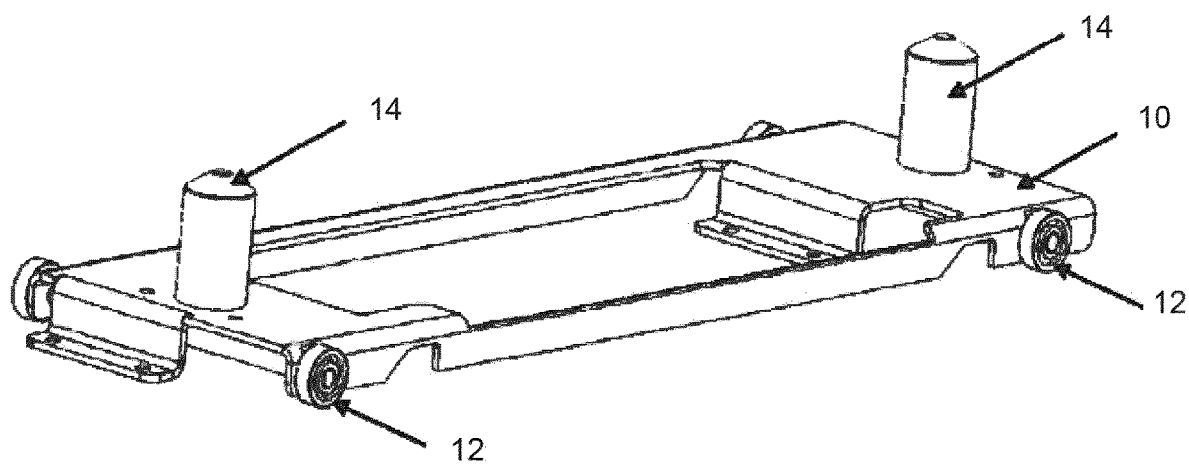
FIG. 3B is an isometric view of a transmission element according to an embodiment.

FIG. 3B shows a transmission element 10 according to one embodiment. The embodiment illustrates where the parts explained with references to the block diagram in FIG. 3A may be arranged within the transmission element 10. As is seen from the figure, in this embodiment the transmission element 10 comprises two horizontally spaced pins 14 that are vertically extending from the transmission element 10. Additionally, the transmission element 10 shown in the figure comprises four guide members 12, two being arranged on a respective long side of the transmission element 10.

Figure 4:
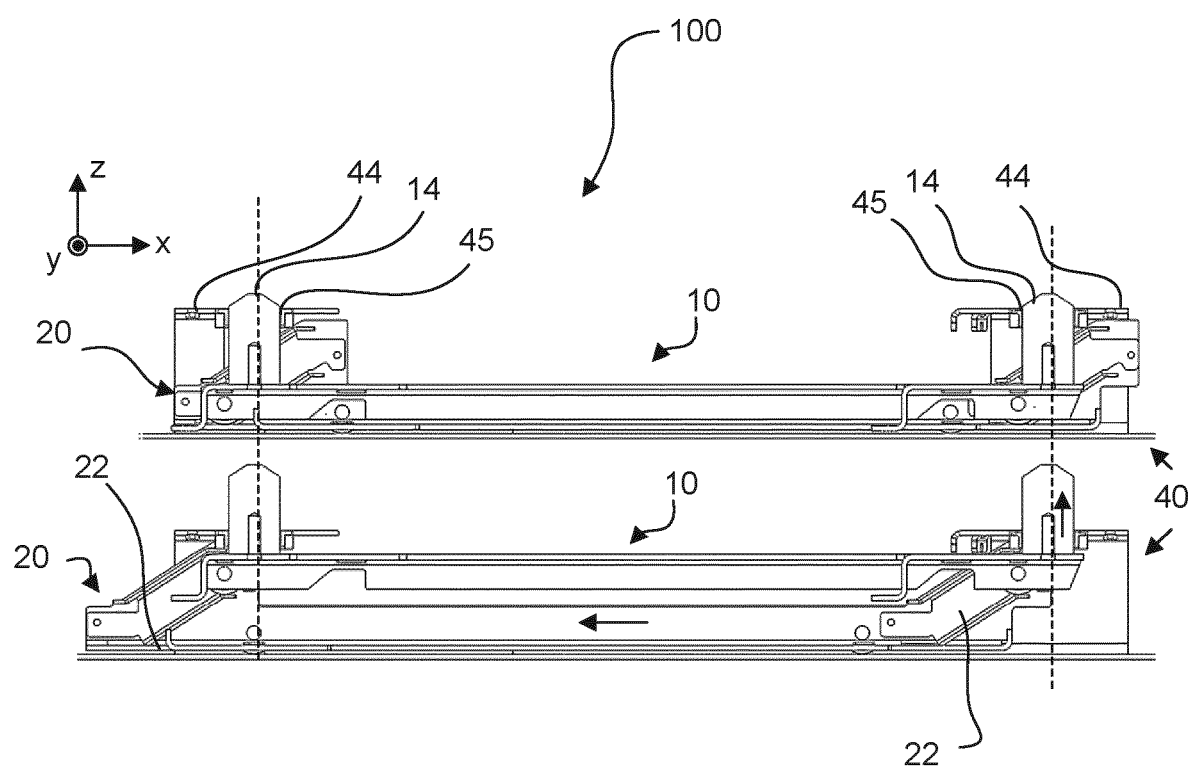
FIG. 4 shows side views of one embodiment of an operation of a transmission arrangement.

FIG. 4 shows one embodiment of an operation of a transmission arrangement 100. An operation of elevating the transmission element 10 in a transmission arrangement 100 is shown. In the upper figure, the transmission arrangement 100 is configured to start elevation of the transmission element 10, and in the lower figure the transmission element 10 has been elevated to a vertically raised position. As is indicated by the arrows shown in the lower figure, the drive unit 30 (not shown) has driven the actuator assembly 20 in the horizontal plane along the surface of the fixed frame 40. Consequently, the steering members 44 of the fixed frame 40 are forcing the pins 14 of the transmission element 10 to restrict any movement of the transmission element 10 in the horizontal plane xy. Hence, the transmission element 10 is guided in the vertical plane z by following the profile of the tilted tracks 22, and the pins 14 are extending through the opening 45 of each steering member 44.

Figure 5A:
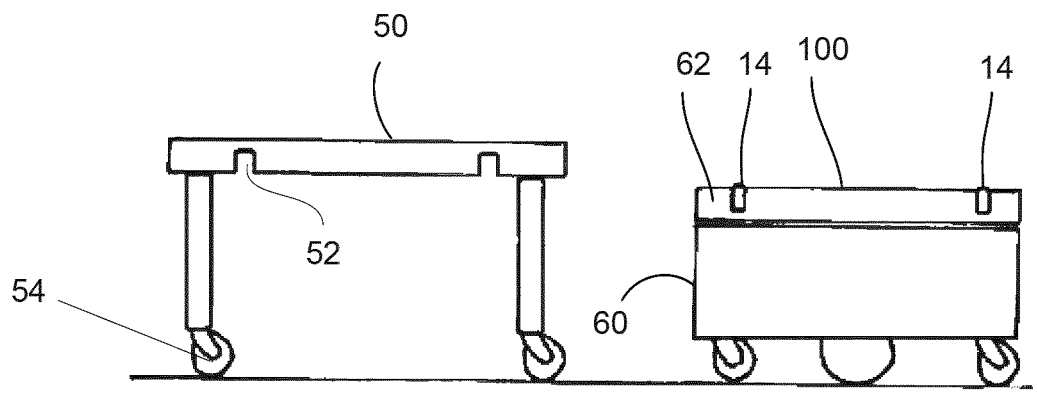
FIGS. 5A-C are side views illustrating a system having a transmission arrangement, a mobile robot and a support structure.
Figure 5B:
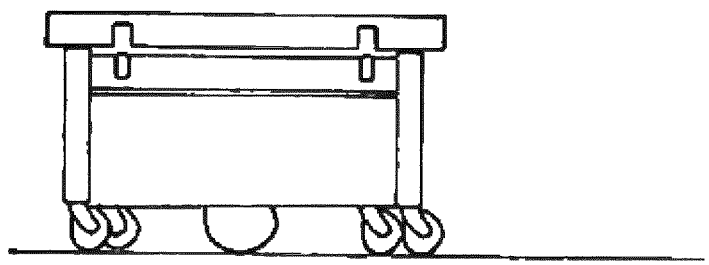
Figure 5C:
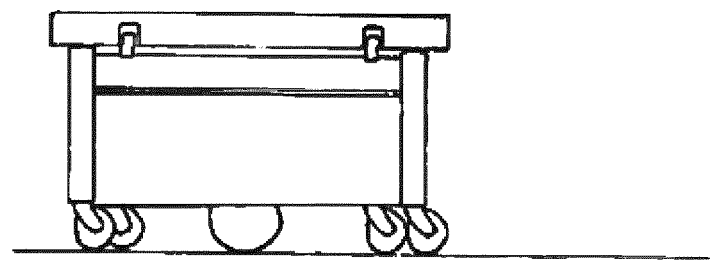

FIGS. 5A-C illustrate a system that comprises a transmission arrangement 100 having the functionality as previously described, a mobile robot 60 and a support structure 50. The mobile robot 60 may be an automated guided vehicle configured to automatically move along the ground or floor in logistics facilities. The mobile robot 60 is typically designed to perform transportation tasks such as transporting an object from one location to another. Depending on the object to be transported, the mobile robot 60 may be arranged in various configurations. In one embodiment, the mobile robot 60 therefore comprises a top module 62 being arranged on the mobile robot 60 in order to provide the mobile robot 60 with different associated equipment. The top module 62 is provided as a separate part, i.e. it is pre-manufactured and later mounted/connected to the mobile robot 60. It should be mentioned that the top module 62 could in some embodiments instead be integrated with the mobile robot 60, i.e. the top module 62 forms part of the mobile robot 60. The top module 62 comprises a transmission arrangement 100 that comprises all of the functionality as previously described. Therefore, the complete transmission arrangement 100 may be installed inside the top module 62 prior to being located on a mobile robot 60, which assures universal compatibility.

In FIG. 5A, the mobile robot 60 is seen as approaching the support structure 50, with the goal of securing the structure 50 to the mobile robot 60.

In FIG. 5B, the mobile robot 60 is aligned with the support structure 50, so that the structure 50 is ready to receive the one or more vertically extending pins 14 of the transmission element 10 by means of vertical recesses 52 arranged at the underside of the support structure 50.

In FIG. 5C, the actuator assembly 20 has been moved in the horizontal plane xy between two different horizontal end positions, and a corresponding movement of the transmission element 10 has thereby been caused between two vertical end positions. Consequently, the pins 14 are vertically extending from the transmission element 10, and fitting the recesses 52 of the support structure 50. The structure 50 is thus locked to the transmission arrangement 100, i.e. to the mobile robot. As the support structure 50, here in the form of a table, is provided with wheels 54 the support structure 50 will be able to follow the movement of the mobile robot 60. Transporting of the support structure 50 is thereby possible due to the operation of the transmission arrangement 100.

Figure 6A:
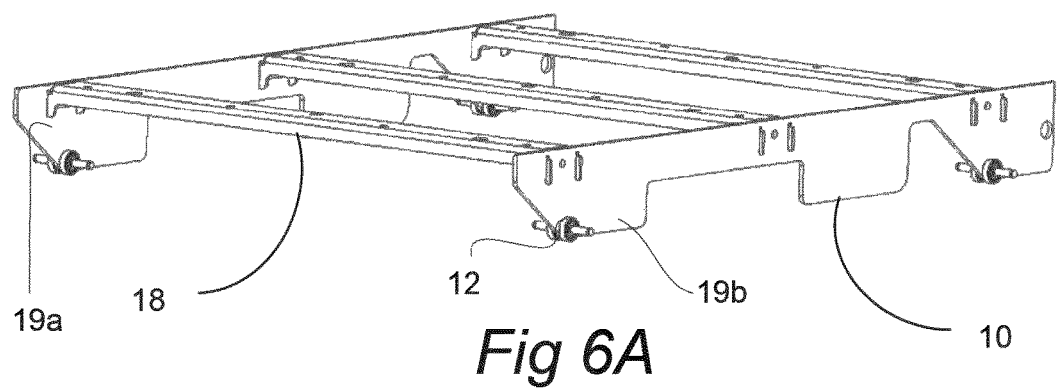
FIGS. 6A-C are isometric views showing one embodiment of a transmission arrangement.
Figure 6B:
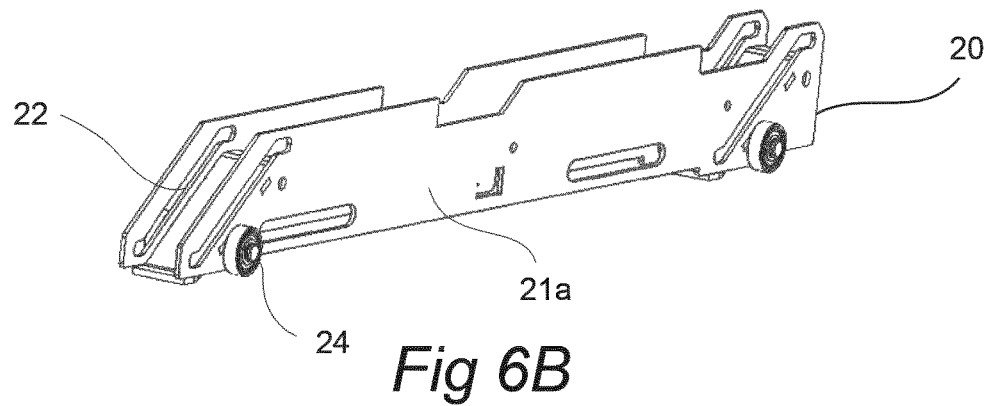
Figure 6C:
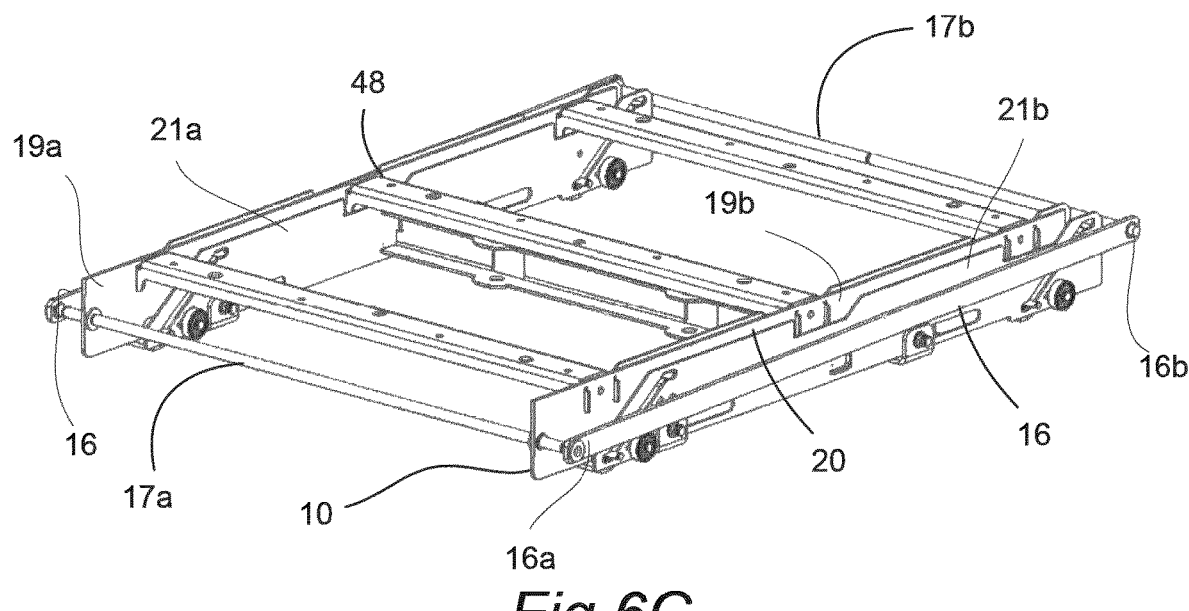

FIGS. 6A-C illustrate one embodiment of a transmission arrangement 100. In this embodiment, the transmission element 10 forms a planar surface 18. The planar surface 18 is in one embodiment adapted to accommodate one or more objects being stored thereon. The planar surface 18 may be substantially parallel with the ground level and may also be connected to the fixed frame 40. As can be seen in the figures, the transmission element 10 comprises two vertically extending parts 19a-b, wherein each part 19a-b of the transmission element 10 is movably connected to an associated part 21a-b of the actuator assembly 20. The vertical parts 19a-b of the transmission element 10 are joined by opposing lateral ends of the planar surface 18, so that the entire transmission element forms a U-shape.

The functionalities of the transmission arrangement 100 in this embodiment is similar to the previously described, with the exception that at least one lever 16 is restricting the horizontal movement of the transmission element 10. The transmission element 10 is at one end pivotally connected to one end 16a of at least one lever 16, which in turn is pivotally connected at its opposite end 16b to the fixed frame 40. In the embodiment shown, two levers 16 are interconnected via two connecting rods 17a, 17b, such that both levers 16 pivots in a similar motion in response to the actuator assembly 20 driving the transmission element 10 in the vertical plane z.

As can be seen in FIG. 6C the two parts 21a-b of the actuator assembly 20 are connected to each other by a transverse beam 21c, or similar structure. Each part 21a-b of the actuator assembly is provided with rollers 24 for guiding the actuator assembly 20 horizontally along a frame, and tilted tracks 22 are provided for guiding rollers 12 of the transmission element 10. The levers 16 will prevent horizontal movement of the transmission element 10 as the actuator assembly 20 is driven, and the tilted tracks 22 will force the transmission element 10 to move vertically.

Figure 7A:
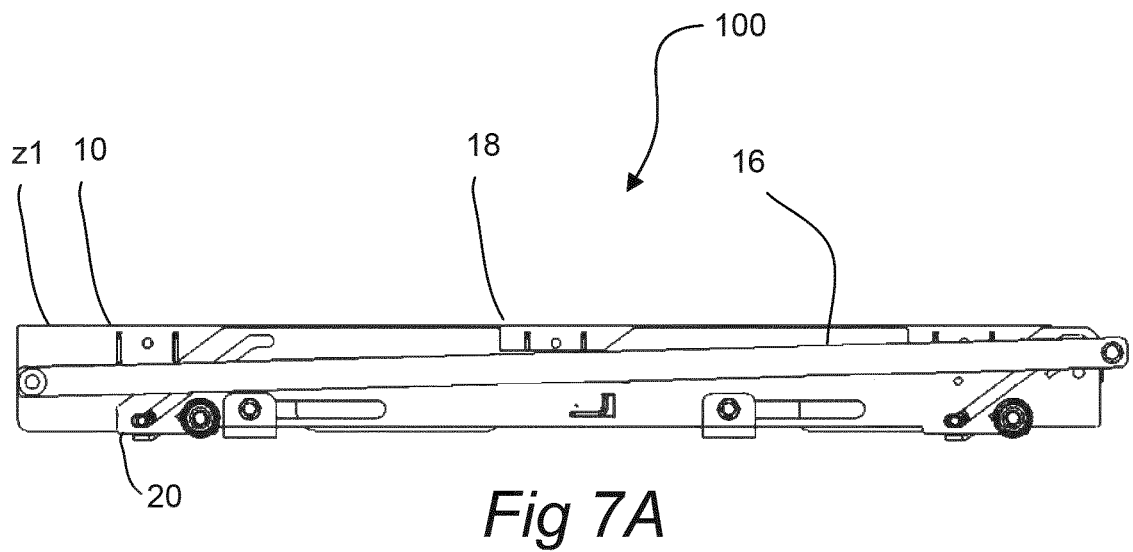
FIGS. 7A-B are side views showing one embodiment of an operation of a transmission arrangement.
Figure 7B:
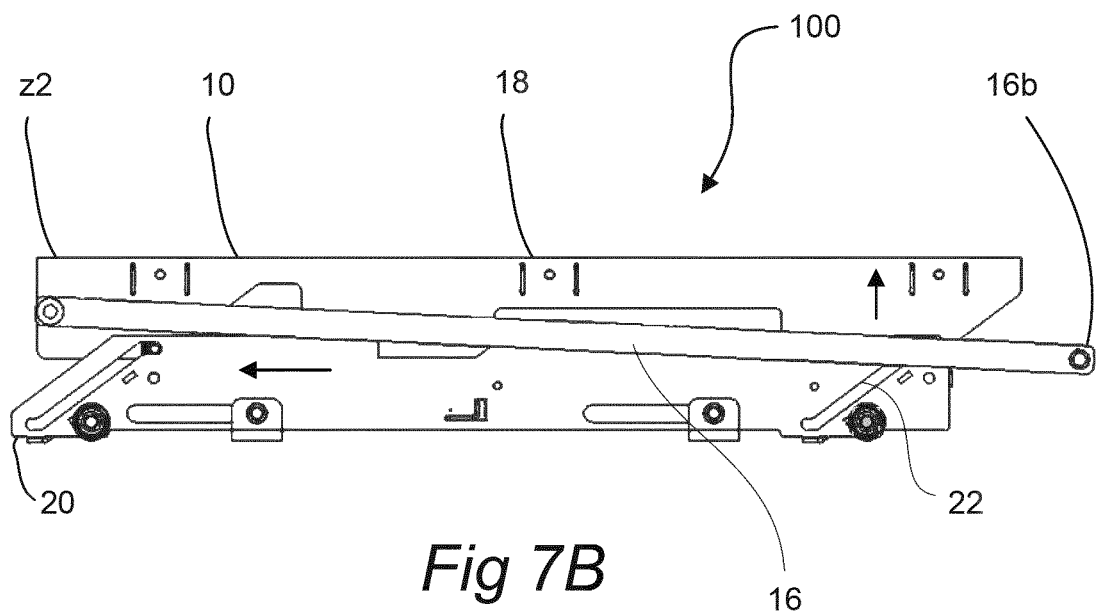

FIG. 7A-B show an operation of elevating the transmission element 10 of a transmission arrangement 100 according to the embodiment described with references to FIGS. 6A-C. In FIG. 7A, the transmission arrangement 100 is configured to start elevation of the transmission element 10 from a first vertical position z1, and in FIG. 7B, the transmission element 10 has been elevated to a second vertical position z2, thereby also elevating the planar surface 18 that is connected to the transmission element 10. As is indicated by the arrows shown in FIG. 7B, the drive unit 30 (not shown) has driven the actuator assembly 20 in the horizontal plane xy along the surface of the fixed frame 40. Consequently, the end 16b of the lever 16 being pivotally connected to the fixed frame 40 is restricting movement of the transmission element 10 in the horizontal plane xy, and the end being pivotally connected to the transmission element 10 forces the transmission element 10 to move along the vertically tilted tracks 22 of the actuator assembly 20. A corresponding movement of the transmission element 10 and the planar surface 18 being connected thereto is thus effectively achieved between the two vertical end positions z1, z2.

Figure 8A:
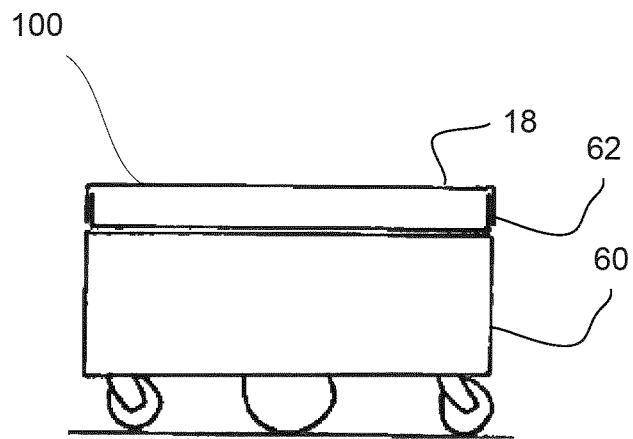
FIGS. 8A-B are side views showing one embodiment of a mobile robot having a transmission arrangement.
Figure 8B:
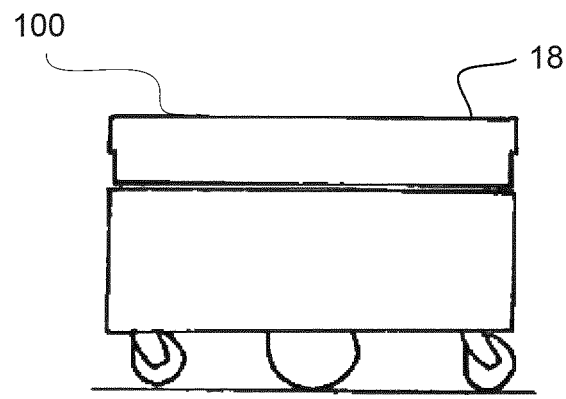

FIGS. 8A-B show a mobile robot 60 comprising a top module 62 according to one embodiment. The embodiment shown is the transmission arrangement 100 as described with FIGS. 6-7. The mobile robot 60 and its top module 62 shown may comprise similar features as the mobile robot 60 previously described. In FIG. 8A, the transmission arrangement 100 is in a non-elevated position. FIG. 8B shows that the transmission arrangement 100 has elevated the planar surface 18.

Figure 9:
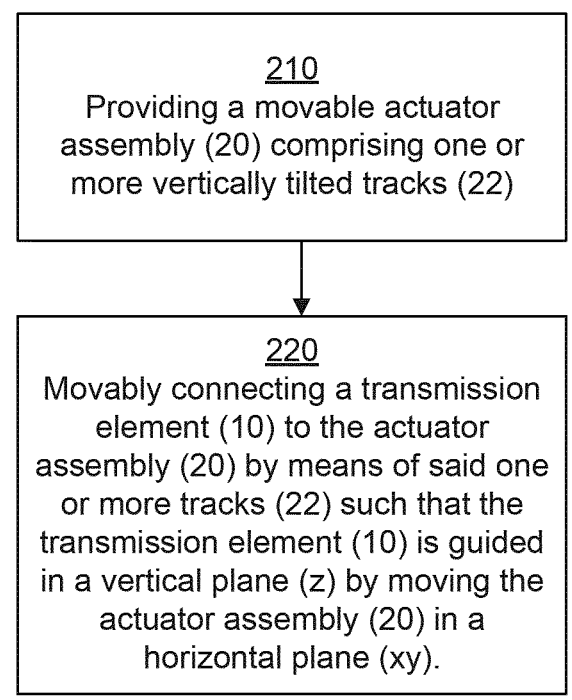
FIG. 9 is a schematic block diagram of a mobile robot transmission method.

FIG. 9 shows a block diagram of a mobile robot transmission method 200. The method 200 comprises a first step of providing 210 a movable actuator assembly 20 comprising one or more vertically tilted tracks 22. The movable actuator assembly 20 is preferably provided within a fixed frame 40, but other structures may also be used. A second step involves movably connecting 220 a transmission element 10 to the actuator assembly 20 by means of said one or more tracks 22, such that the transmission element 10 is guided in a vertical plane z by moving the actuator assembly 20 in a horizontal plane xy. The method 200 may be performed at any time in a logistics environment where it is necessary to adjust the height of a mobile robot 60 or a support structure 50. The method 200 may be performed autonomously by a control unit (not shown) that is instructing the mobile robot 60 to adjust its height. The control unit may be a part of a bigger communication system within a logistics facility, or a component internal to the mobile robot 60. Alternatively, the method 200 may be performed by a user, by manually activating the drive unit 30 of the actuator assembly 20. The flexibility of performing the method 200 improves universal compatibility no matter what mobile robot 60 or other vehicle is used for the transmission arrangement 100.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A mobile robot transmission arrangement, comprising:
a movable actuator assembly; and
a transmission element being movably connected to the actuator assembly such that the transmission element is guided in a vertical plane (z) by moving the actuator assembly in a horizontal plane (xy),
wherein the actuator assembly comprises one or more vertically tilted tracks, and wherein the transmission element is connected to the actuator assembly by means of said one or more tracks,
wherein the transmission element further comprises one or more vertically extending pins configured to engage with a corresponding recess of an associated support structure when the transmission element is in a vertically elevated position, and wherein each of one or more steering members of a fixed frame comprises an opening configured to receive an associated pin, such that only vertical movement of the pin relative the opening is allowed thereby preventing horizontal movement of the transmission element.

2. The transmission arrangement according to claim 1, wherein the transmission element is provided with at least one guide member fitted in a respective track of the actuator assembly in a sliding or rolling engagement.

3. The transmission arrangement according to claim 1, further comprising a fixed frame supporting the actuator assembly and the transmission element.

4. The transmission arrangement according to claim 3, wherein the fixed frame comprises one or more linear tracks, and wherein the actuator assembly further comprises at least one guide member movably supported by said one or more linear tracks.

5. The transmission arrangement according to claim 1, wherein the actuator assembly is movable in a linear direction between two different horizontal end positions (xy1, xy2), thereby causing a corresponding movement of the transmission element between two vertical end positions (z1, z2).

6. The transmission arrangement according to claim 1, wherein the actuator assembly comprises a drive unit for driving the actuator assembly.

7. The transmission arrangement according to claim 6, wherein the drive unit comprises an electrical linear actuator.

8. The transmission arrangement according to claim 1, wherein the transmission element is at one end pivotally connected to at least one lever, which in turn is pivotally connected to the fixed frame at its opposite end.

9. The transmission arrangement according to claim 8, wherein the transmission element is connected to a planar surface that is adapted to be vertically elevated by the transmission element.

10. A mobile robot comprising a top module having a transmission arrangement according to claim 1.

11. A system comprising a mobile robot according to claim 10, and a support structure.

12. A support structure, such as a table or a cart, being adapted to receive one or more pins of a transmission element in a transmission arrangement according to claim 1.

13. A mobile robot transmission arrangement, comprising:
   a movable actuator assembly; and
   a transmission element being movably connected to the actuator assembly such that the transmission element is guided in a vertical plane (z) by moving the actuator assembly in a horizontal plane (xy),
   wherein the actuator assembly comprises two parts, each part being provided with one or more vertically tilted tracks, and wherein the transmission element is connected to the actuator assembly by means of said one or more tracks,
   wherein each part of the actuator assembly is provided with rollers for guiding the actuator assembly horizontally along a frame, and wherein the tilted tracks are provided for guiding rollers of the transmission element.

* * * * *